(12) United States Patent
Kaner et al.

(10) Patent No.: US 8,470,203 B2
(45) Date of Patent: Jun. 25, 2013

(54) FABRICATION OF POLYANILINE NANOFIBER DISPERSIONS AND FILMS

(75) Inventors: Richard B. Kaner, Pacific Palisades, CA (US); Dan Li, Seattle, WA (US); Jiaxing Huang, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 608 days.

(21) Appl. No.: 12/724,252

(22) Filed: Mar. 15, 2010

(65) Prior Publication Data

US 2010/0173076 A1 Jul. 8, 2010

Related U.S. Application Data

(62) Division of application No. 11/356,790, filed on Feb. 17, 2006, now abandoned.

(51) Int. Cl.
| | |
|---|---|
| *H01B 1/00* | (2006.01) |
| *C08G 73/00* | (2006.01) |
| *B05D 5/12* | (2006.01) |

(52) U.S. Cl.
USPC .............................. 252/500; 528/422; 427/58

(58) Field of Classification Search
USPC ...................... 252/500; 528/422, 423; 427/58
See application file for complete search history.

(56) References Cited

U.S. PATENT DOCUMENTS

| | | | |
|---|---|---|---|
| 5,232,631 A | 8/1993 | Cao et al. | |
| 5,489,400 A | 2/1996 | Liu et al. | |
| 6,030,551 A | 2/2000 | Ho et al. | |
| 2001/0012884 A1 | 8/2001 | Dhawan et al. | |
| 2005/0126909 A1* | 6/2005 | Weiller et al. | 204/418 |
| 2005/0131139 A1 | 6/2005 | Kaner et al. | |
| 2005/0269555 A1 | 12/2005 | Lee et al. | |
| 2006/0051401 A1* | 3/2006 | Manohar et al. | 424/443 |
| 2007/0034836 A1 | 2/2007 | Epstein et al. | |

OTHER PUBLICATIONS

MacDiarmid, A. G. "Synthetic Metals: A Novel Role for Organic Polymers", *Angew. Chem.Int.Ed.* 40, 2581-2590 (2001).
Cao, Y., Andreatta, A., Heeger, A. J., Smith, P., "Influence of Chemical Polymerization Conditions on the Properties of Polyaniline", *Polymer 30*, 2305 (1989) (Abstract only).
Chiang, J.-C, MacDiarmid, A. G, Polyaniline-Protonic Acid Doping of the Emeraldine Form to the Metallic Regime, *Synth. Met.* 13, 193 (1986) (Abstract only).
Peng, X. G. et al, Shape Control of CdSe Nanocrystals, *Nature*, 404, 59-61 (2000).
Puntes, V. F., Krishnan, K. M., Alivisatos A.P., "Colloidal Nanocrystal Shape and Size Control: The case of Cobalt", *Science 291*, 2115-2117 (2001).
Sun, Y. G., Xia, Y., "Shape-Controlled Synthesis of Gold and Silver Nanoparticles", *Science 298*, 2176-2179 (2002).

(Continued)

*Primary Examiner* — Mark Kopec
*Assistant Examiner* — Jaison Thomas
(74) *Attorney, Agent, or Firm* — Koppel, Patrick, Heybl & Philpott; Michael J. Ram

(57) ABSTRACT

A new method for forming stable polyaniline nanofiber colloids uses electrostatic repulsion to maintain dispersion of the nanofibers and prevent aggregation during synthesis of the nanofibers. The colloidal suspensions are formed directly from the reactants in solution maintained at a pH of about 1.0 to about 4.0 and a temperature of about 10° C. to about 100° C. with minimal or no stirring. Also set forth are new methods for forming ultrathin films of polyaniline nanofibers via self-assembly.

12 Claims, 13 Drawing Sheets

OTHER PUBLICATIONS

Kim, F., Connor, S., Song, H., Kuykendall, T., Yang, P., "Platonic Gold Nanocrystals", *Angew. Chem. Int. Ed.* 43, 3673-3677 (2004).

Peng, X. G., "Mechanisms for the Shape-Control and Shape-Evolution of Colloidal Semiconductor Nanocrystals", *Adv. Mater.*, 15, 459-463 (2003).

Pileni, M. P., "The Role of Soft Colloidal Templates in Controlling the Size and Shape of Inorganic Nanocrystals", *Nat. Mater*, 2, 145-150 (2003).

Xia, Y. et al., "One-Dimensional Nanostructures: Synthesis, Characterization, and Applications", *Adv. Mater.*, 15, 353-389 (2003).

Huynh. W. U., Dittmar, J. J., Alivisatos, A. P. "Hybrid Nanorod Polymer Solar Cells", *Science*, 295, 2425-2427 (2002).

Ames, S. P., Aldissi M, "Novel Colloidal Dispersions of Polyaniline", *J. Chem. Soc., Chem. Commun*, 88 (1989).

Cooper, E. C., Vincent, B. Electrically Conducting Organic Films and Beads on Conducting Latex-Particles, *J.Phys.D*, 22, 1580-1585 (1989).

Osterholm, J. E., Cao, Y., Klavetter, F., Smith, P. "Emulsion Polymerization of Aniline", *Polymer*, 35, 2902 (1994) (Abstract only).

Barisci, J. N, Innis, P. C, KaneMaguire, L. A. P, Norris, I. D. Wallace, G.G.,. Preparation Ofchiral Conducting Polymer Colloids, *Synth. Met,.* 84, 181-182 (1997).

Moulton S.E, Innis, P. C, KaneMaguire, L. A. P, Ngamna 0, Wallace, G.G.. "Polymerisation and Characterisation of Conducting Polyaniline Nanoparticle Dispersions", *Curr. Appl Phvs.*, 4, 402 (2004).

Stejskal, J. et.al. "Polyaniline Dispersions, 8. The Control of Particle Morphology", *Polymer*, 40, 2487-2491 (1999).

Zhang, X., Goux, W. L., Manohar, S. K. "Synthesis of Polyaniline Nanofibers by Nanofiber Seeding" *J. Am. Chem. Soc.*, 126, 4502-4503 (2004).

Zhang, X. Y., Manohar, S. K., "Polyaniline Nanofibers: Chemical Synthesis Using Surfactants", *Chem. Commun*, 2360-2361 (2004).

Wei, Z. X., Zhang, Z. M., Wan, M X., "Formation Mechanism of Self-Assembled Polyaniline, Micro/Nanotubes", *Langmuir*, 18, 917-921 (2002).

Chiou, N. R., Epstein, A. J., "Polyaniline Nanofibers Prepared by Dilute Polymerization", *Adv.Mater.*, 17, 1679-1683 (2005).

Huang, J., Virji, S., Weiller, B. H., Kaner, R. B. "Polyaniline Nanofibers: Facile Synthesis and Chemical Sensors", *J Am. Chem. Soc.*, 125, 314-315 (2003).

P. R. Somani, "Synthesis and Characterization of Polyaniline Dispersions", *Mater. Chem. Phys.*, 77, 81-85 (2002).

M. Gill, J. Mykytiuk, S. P. Armes, J. L. Edwards, T. Yeates, P. J. Moreland, C. Mollett, "Novel Colloidal Polyaniline Silica Composites", *J. Chem. Soc., Chem. Commun.*, 108-109 (1992).

J. Yue, Z. H. Wang, K. R. Cromack, A. J. Epstein, A. G. MacDiarmid, "Effect of Sulfonic-Acid Group on Polyaniline Backbone", *J. Am. Chem. Soc.*, 113, 2665-2671 (1991).

H. S. O. Chan, P. K. H. Ho, S. C. Ng, B. T. G. Tan, K. L. Tan, "A New Water-Soluble, Self-Doping Conducting Polyaniline from Poly(o-aminobenzylphosphonic acid) and Its Sodium Salts: Synthesis and Characterization", *J. Am. Chem. Soc.*, 117, 8517-8523 (1995).

Y. Cao, P. Smith, A. J. Heeger, "Counterion Induced Processibility of Conducting Polyaniline and of Conducting Polyblends of Polyaniline in Bulk Polymers", *Synth. Met.*, 48, 91-97 (1992).

J. Huang, R. B. Kaner, "Nanofiber Formation in the Chemical Polymerization of Aniline: A Mechanistic Study", *Angew. Chem., Int. Ed*, 43, 5817-5821 (2004).

Oles, V. "Shear-Induced Aggregation and Breakup of Polystyrene Latex-Particles", *J. Colloid Interface Sci 154*, 351 (1992) (Abstract only).

Avlyanov, J. K., Josefowicz, J. Y., MacDiarmid, A. G, "Atomic-Force Microscopy Surface Morphology Studies of In-Situ Deposited Polyaniline Thin Films", *Synth, Met.*, 73, 205-208 (1995).

Stajskal, J., Sapurine, I., Prokes, .J. Zemek, "In-Situ Polymerized Polyaniline Films", *Synth. Met.* 105, 195-202 (1999).

Blaak, R., Auer, S., Frenkel, D, Lowen, M. "Crystal Nucleation of Colloidal Suspensions Under Shear", *Phys. Rev. Lett.*, 93, 068303-1-068303-4 (2004).

Xia, Y., Wiesinger, J. M., MacDiarmid, A. G, Epstein, A. J., "Camphor-Sulfonic Acid Fully Doped Polyaniline Emeraldine Salt-Conformations in Different Solvents Studied by an Ultraviolet-Visible Near-Infrared Spectroscopic Method", *Chem. Mater*, 7, 443-445 (1995).

Stober, W., Fink, A. Controlled Growth of Monodisperse Silica Sphears in Micron Size Range, *J Colloid Interface Sci.*, 26, 62 (1968) (Abstract only).

J. Stejskal, I. Sapurina, "On the Origin of Colloidal Particles in the Dispersion Polymerization of Aniline", *J. Colloid Interface Sci.*, 274, 489-495 (2004).

J. H. Cheung, W. B. Stockton, M. F. Rubner, "Molecular-level processing of conjugated polymers .3. Layer-by-layer manipulation of polyaniline via electrostatic interactions", *Macromolecules*, 30, 2712-2716 (1997).

Wei, Yen et al., "Monitoring the Chemical Polymerization of Aniline by Open-Circuit-Potential Measurements", *Polymer*, 35, Issue 16, 3572-3575 (Aug. 1994) (Abstract only).

Zhang, Xinyu et al., "Nanofibers of Polyaniline Synthesized by Interfacial Polymerization", *Synthetic Metals*, 145, 23-29 (2004).

Gates, Byron et al., "A Solution-Phase Approach to the Synthesis of Uniform Nanowires of Crystalline Selenium with Lateral Dimensions in the Range of 10-30 nm", *J. Am. Chem. Soc.*, 122, 12582-12583 (2000).

Li, Wenguang et al., "Oligomer-Assisted Synthesis of Chiral Polyaniline Nanofibers", *J. Am. Chem. Soc.*, 126, 2278-2279 (2004).

Huang, Jiaxing et al., "A General Chemical Route to Polyaniline Nanofibers", *J. Am. Chem. Soc.*, 126, 851-855 (2004).

Huang, Jiaxing, Kaner, R. B., "Flash Welding of Conducting Polymer Nanofibres", *Nat. Mat.*, 3, 783-786 (2004).

Virji, Shabnam, Huang, J., Kaner, R. B., Weiller, B. H., "Polyaniline Nanofiber Gas Sensors Examination of Response Mechanisms", *Nano Lett.*, 4, 491-496 (2004).

Hammond, Paula T., "Form and Function in Multilayer Assembly: New Applications at the Nanoscale", *Adv. Mater.*, 16, 1271-1293 (2004).

Behrens, S. H., Grier, D. G., "The Charge of Glass and Silica Surfaces", *J. Chem. Physics*, 115, 6716-6721 (2001).

Pénicaud, A., Poulin, P., Derré, A., Anglaret, E., Petit, P., "Spontaneous Dissolution of a Single-Wall Carbon Nanotube Salt", *J. Am. Chem. Soc.*, 127, 8-9 (2005).

J. L. Bahr, J. M. Tour, "Covalent Chemistry of Single-Wall Carbon Nanotubes", *J. Mater. Chem.*, 12, 1952-1958 (2002).

T. A. Skotheim, R. L. Elsenbaumer, J. R. Reynolds, "Handbook of Conducting Polymers", *Marcel Dekker*, New York, $2^{nd}$ Edn., pp. 1-2. (1997).

R. J. Hunter, "Foundations of Colloid Science", *Oxford University Press*, New York, pp. 1-2 (1987).

Zettlemoyer, A. C., "Nucleation", *Marcel Dekker*, New York, pp. 2-3 (1969).

Kashchiev, D., Nucleation: Basic Theory with Applications, *Butterworth-Heinemann*, Oxford, pp. 3-4 (2000).

\* cited by examiner

FABRICATION OF POLYANILINE NANOFIBER DISPERSIONS AND FILMS

This is a Divisional application of application Ser. No. 11/356,790, filed Feb. 17, 2006 no abandoned.

This patent is directed to processes for forming stable colloidal dispersions of nanofibers by controlling the stirring rate during nanofiber formation, purifying the polyaniline, and controlling the pH during colloid formation. Also addressed are the formations of continuous films of polyaniline on substrates using these stable colloids and methods for forming ultrathin films of the nanofibers.

BACKGROUND

Polyaniline is one of the most useful conducting polymers due to its facile synthesis, environmental stability and simple acid/base doping/dedoping chemistry (MacDiamid, A. G. "Synthetic Metals: A Novel Role For Organic Polymers", *Angew. Chem. Int. Ed.* 40, 2581 (2001). Since its electrical conducting mechanism was explored in the 1980's, this electroactive polymer has been extensively investigated for many applications including antistatic and anticorrosion coatings, chemical sensors and electrodes for light-emitting diodes, capacitors and batteries. One of the simplest methods for synthesizing bulk polyaniline is the chemical polymerization of aniline with an oxidant ammonium peroxydisulfate in an acidic aqueous solution. Since polymerization is an exothermic process, it has long been recommended that this reaction be carried out at low temperatures with one reactant slowly added into the other under vigorous stirring (Cao, Y., Andreatta, A., Heeger, A. J., Smith, P., "Influence Of Chemical Polymerization Conditions On The Properties Of Polyaniline", *Polymer* 30, 2305 (1989); Chiang, J.-C, MacDiamid, A. G, "Polyaniline-Protonic Acid Doping Of The Emeraldine Form To The Metallic Regime, *Synth. Met.* 13, 193 (1986)). However, when polyaniline is synthesized at room temperature or below via the conventional method, using an ordinary magnetic stirrer bar to agitate the reaction mixture, the product settles out quickly from the reaction solution and films cast from its suspension are rough and discontinuous and therefore unsatisfactory for most applications (FIG. 1). A close look at the purified powder with a scanning electron microscope SEM indicates that as-synthesized polyaniline consists of coral-like, granular particulates.

Processability is crucial to many applications of nanostructured materials. However, a major problem in processing these materials is their stability in colloidal suspensions and their tendency to agglomerate. Aggregation is very common in the production and use of many chemical and pharmaceutical products, especially nanoparticles. Aggregation has been conventionally ascribed to the direct mutual attraction between particles via van der Waals forces or chemical bonding. Aggregation is a common, yet complex, phenomenon for small particles. Strategies for preventing aggregation mainly come from conventional colloid science in which particles are coated with foreign capping agents and/or the surface charges are tailored to separate them via electrostatic repulsions (R. J. Hunter, "Foundations of Colloid Science", Oxford University Press, New York, 1 (1987)).

Shape control of nanoparticles, especially synthesis of one-dimensional nanostructures, has received growing interest in recent years. Research in this field has created many novel nanostructures for a wide range of applications (Peng, X. G. et al, "Shape Control Of CdSe Nanocrystals, *Nature*, 404, 59 (2000); Puntes, V. F., Krishnan, K. M., Alivisatos A. P., "Colloidal Nanocrystal Shape And Size Control: The Case Of Cobalt", *Science* 291, 2115 (2001); Sun, Y. G., Xia, Y., "Shape-Controlled Synthesis Of Gold And Silver Nanoparticles", *Science* 298, 2176 (2002); Kim, F., Connor, S., Song, H., Kuykendall, T., Yang, P., "Platonic Gold Nanocrystals", *Angew. Chem. Int. Ed.* 43, 3673 (2004); Peng, X. G., "Mechanisms For The Shape-Control And Shape-Evolution Of Colloidal Semiconductor Nanocrystals", *Adv. Mater.,* 15, 459 (2003); Pileni, M. P., "The Role Of Soft Colloidal Templates In Controlling The Size And Shape Of Inorganic Nanocrystals", *Nat. Mater,* 2, 145 (2003); Xia, Y. et al, "One-Dimensional Nanostructures: Synthesis, Characterization, And Applications", *Adv. Mater.,* 15, 353 (2003); Huynh. W. U., Dittmer, J. J., Alivisatos, A. P. "Hybrid Nanorod Polymer Solar Cells", *Science,* 295, 2425 (2002). Rationally mediating the nucleation and growth process has been shown to be the key to controlling the shape and size of nanoparticles. Mechanical stirring is a routine operation in chemical reactions. Since stirring can affect nucleation and aggregation, this factor must be considered when one carries out or attempts to reproduce a synthetic process involving particles. Of particular importance is that shear in a fluid induced by stirring is strongly dependent on the stirring speed, the geometry and size of the reactor and the structure of the stirring impellers. These factors may be especially important when nanoparticle production is scaled up. Due to a lack of understanding of the nucleation behavior of polyaniline and particularly the effects of stirring, the simple idea that the conventional reaction for the synthesis of polyaniline is capable of producing highly dispersible conducting nanofibers has been overlooked for decades.

In order to make dispersible polyaniline nanoparticles, many methods have been developed, such as emulsion and dispersion polymerizations and a large number of surfactants and templates have been tested to improve the processability of this polymer (Stejskal, J., "Colloidal Dispersions Of Conducting Polymers", *J Polym. Mater.* 18, 225 (2001); Ames, S. P., Aldissi M, "Novel Colloidal Dispersions Of Polyaniline", *J. Chem. Soc., Chem. Commun,* 88 (1989); Cooper, E. C., Vincent, B. "Electrically Conducting Organic Films And Beads On Conducting Latex-Particles, *J. Phys. D,* 22, 1580 (1989); Osterholm, J. E., Cao, Y., Klavetter, F., Smith, P. "Emulsion Polymerization Of Aniline", Polymer, 35, 2902 (1994); Barisci, J. N, Innis, P. C, KaneMaguire, L. A. P, Norris, I. D. Wallace, G. G., "Preparation Of chiral Conducting Polymer Colloids, *Synth. Met,* 84, 181 (1997); Moulton S. E, Innis, P. C, KaneMaguire, L. A. P, Ngamna O, Wallace, G. G. "Polymerisation And Characterisation Of Conducting Polyaniline Nanoparticle Dispersions", *Curr. Appl Phys.,* 4, 402 (2004); Stejskal, J. et. al. "Polyaniline Dispersions, 8. The Control Of Particle Morphology", *Polymer,* 40, 2487 (1999); Zhang, X., Goux, W. L., Manohar, S. K. "Synthesis Of Polyaniline Nanofibers By Nanofiber Seeding" *J. Am. Chem. Soc.,* 126, 4502 (2004); Zhang, X. Y., Manohar, S. K., "Polyaniline Nanofibers: Chemical Synthesis Using Surfactants", *Chem. Commun,* 2360 (2004); Zhang, X.Y., Chan-YuKing, R., Jose, A., Manohar, S. K, "Nanofibers of polyaniline synthesized by interfacial polymerization". *Synth. Met.,* 145, 23 (2004); Wei, Z. X., Zhang, Z. M., Wan, M X., "Formation Mechanism of Self-Assembled Polyaniline Micro/Nanotubes", *Langmuir,* 18, 917 (2002); Chiou, N. R., Epstein, A. J., "Polyaniline Nanofibers Prepared By Dilute Polymerization", *Adv. Mater.,* 17, 1679 (2005)). Applicants have recently demonstrated that polyaniline nanofibers can be readily obtained by interfacial polymerization (Huang, J., Virji, S., Weiller, B. H., Kaner, P. B. "Polyaniline Nanofibers: Facile Synthesis And Chemical Sensors", *J. Am. Chem. Soc.,* 125, 314 (2003) or simply by rapidly mixing an aqueous solution of aniline and an oxidant, instead of slow addition of one reactant to the other (Huang, J., Kaner, P. B. "Nanofiber Formation In The Chemical Polymerization Of Aniline: A Mechanistic Study", *Angew Chem. Int. Ed.,* 43, 5817 (2004). Thick films can be readily fabricated from colloidal dispersions through casting, while monolayers can be created by electrostatic self-assembly. The exceptional processability of these electroactive one-dimensional nanostructures provides significant advantages in both conventional uses of conducting polymers and emerging applications in nanotechnology.

According to the established theory for the stabilization of colloids, both steric repulsion (by using a polymer or surfactant as stabilizer) and electrostatic repulsion (by introducing charge to the particle surfaces) are often utilized to stabilize a colloid. However, most of the processes for preparing conducting polymer colloids so far have been based on steric repulsion with little attention paid to electrostatic stabilization. (T. A. Skotheim, R. L. Elsenbaumer, J. R. Reynoldsd, "Handbook of Conducting Polymers", *Marcel Dekker,* New York, 2nd edn., pp. 423-435 (1997); S. P. Armes, M. Aldissi, "Novel Colloidal Dispersions of Polyaniline", *J. Chem. Soc., Chem. Commun.,* (1989), E. C. Cooper, B. Vincent, "Electrically Conducting Organic Films and Beads Based on Conducting Latex-Particles", *J. Phys. D,* 22, 1580 (1989); J. Stejskal, I. Sapurina, "On the Origin of Colloidal Particles in the Dispersion Polymerization of Aniline", *J. Colloid Interface Sci.,* 274, 489 (2004); P. R. Somani, "Synthesis and Characterization of Polyaniline Dispersions", *Mater. Chem. Phys.,* 77, 8.1 (2002); M. Gill, J. Mykytiuk, S. P. Armes, J. L. Edwards, T. Yeates, P. J. Moreland, C. Mollett, "Novel Colloidal Polyaniline Silica Composites", *J. Chem. Soc., Chem. Commun.,* 108 (1992)) The backbone of the emeraldine form of polyaniline doped by a protonic acid (HA-) is positively charged;

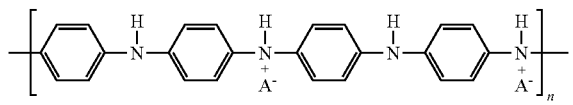

Therefore, a stable colloid can be formed through electrostatic repulsion without using steric stabilizers if the particle size is kept sufficiently small.

One of the major goals in the field of conducting polymers since its inception has been to make them processable. Enormous effort has been directed towards functionalization, copolymerization and blending to enhance solubility. However, there is a trade-off in terms of cost, purity, scalability and conductivity. For example, the solubility of polyaniline can be enhanced through chemical modifications, e.g. inserting substituents either on the phenyl ring or on the nitrogen. (J. Yue, Z. H. Wang, K. R. Cromack, A. J. Epstein, A. G. MacDiamid, "Effect of Sulfonic-Acid Group on Polyaniline Backbone", *J. Am. Chem. Soc.,* 113, 2665 (1991); H. S. O. Chan, P. K. H. Ho, S. C. Ng, B. T. G. Tan, K. L. Tan, "A New Water-Soluble, Self-Doping Conducting Polyaniline from Poly(o-aminobenzylphosphonic acid) and Its Sodium Salts: Synthesis and Characterization", *J. Am. Chem. Soc.,* 117, 8517 (1995); Y. Cao, P. Smith, A. J. Heeger, "Counterion Induced Processability Of Conducting Polyaniline And Of Conducting Polyblends Of Polyaniline In Bulk Polymers", *Synth. Met.,* 48, 91 (1992)) However, the resulting chain torsion generally causes significant decreases in conductivity. Solubility can also be improved with the use of compatible doping acids, but the counterion-induced processability appears to be only suitable with organic solvents.

Another strategy to address the processability of conducting polymers is to form colloidal dispersions through emulsion polymerization of aniline in the presence of steric stabilizers, such as surfactants, water-soluble polymers or silica colloids. (T. A. Skotheim, R. L. Elsenbaumer, J. R. Reynolds, "Handbook of Conducting Polymers", *Marcel Dekker,* New York, 2nd edn., pp. 423-435 (1997); S. P. Armes, M. Aldissi, "Novel Colloidal Dispersions of Polyaniline", *J. Chem. Soc., Chem. Commun.,* (1989), E. C. Cooper, B. Vincent, "Electrically Conducting Organic Films and Beads Based on Conducting Latex-Particles", *J. Phys. D,* 22, 1580 (1989); J. Stejskal, I. Sapurina, "On the Origin of Colloidal Particles in the Dispersion Polymerization of Aniline", *J. Colloid Interface Sci.,* 274, 489 (2004); P. R. Somani, "Synthesis and Characterization of Polyaniline Dispersions", *Mater. Chem. Phys.,* 77, 8.1 (2002); M. Gill, J. Mykytiuk, S. P. Armes, J. L. Edwards, T. Yeates, P. J. Moreland, C. Mollett, "Novel Colloidal Polyaniline Silica Composites", *J. Chem. Soc., Chem. Commun.,* 108 (1992)) However, these stabilizer-assisted dispersions are actually mixtures of polyaniline and other polymers/surfactants, which is disadvantageous for many applications. It is also tedious or impractical to remove by-products from the resultant mixtures. Additionally, the fabrication of nanoscale films from stabilizer-assisted dispersions has proven to be difficult. It has also been found that the quality of the products such as the shape and stability of their dispersions varied with different synthetic batches.

SUMMARY

Critical processing parameters for the formation of polyaniline nanofibers, stable colloids thereof and usable films from these colloids comprise reaction pH, temperature, purity and stirring conditions. In particular, reaction at room temperature (about 20° C. to about 30° C.) and a pH of about 2.6 is preferred. Colloid stability results from multiple cycles of washing and centrifugation. In addition, slow addition of reactants and continuous stirring appears to be detrimental to the formation of nanofibers with the desired configuration. The stable colloids are preferentially formed with rapid addition of the reactants with vigorous mixing only during the initial addition stage, the stirring being terminated prior to initiation of polymerization. Rapid stirring or mixing through the entire polymerization process results in a high degree of aggregation and granular nanoparticles.

DETAILED DESCRIPTION

We have now determined that the quality of the polyaniline formed is dependent on the pH of the reaction mixture and reproducibility problems between different dispersion batches are mainly caused by the level of mechanical stirring, a routine procedure used in most solution-phase chemical reactions.

Figure 2:
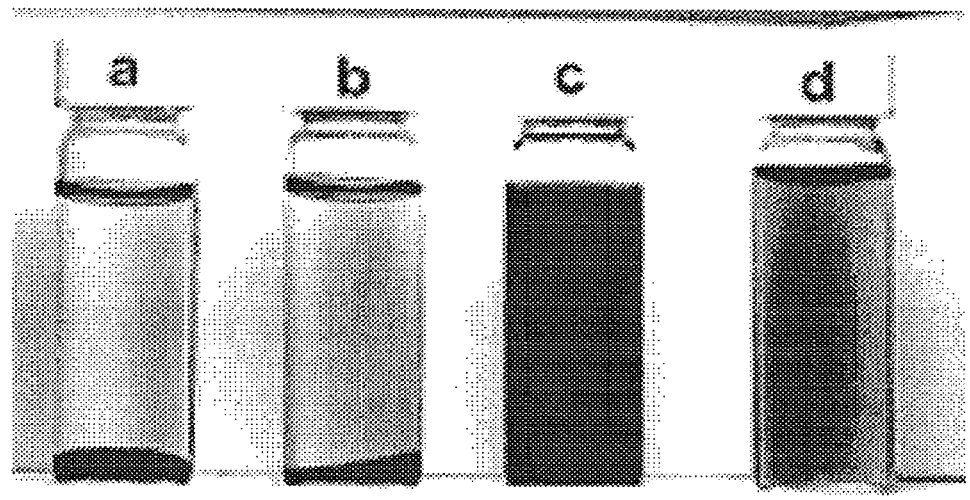
FIG. 2 shows as-polymerized polyaniline nanofibers after washing with water and centrifugation at 3000 rpm for 0.5 h (a), washing and centrifugation twice (b) washing and centrifugation three times (c) and diluting c with water in a 4:1 ratio (d).

As shown in FIG. 2, stable polyaniline nanofiber colloids are formed when centrifugation is employed to purify polyaniline nanofibers prepared by rapid mixing a solution of aniline, ammonium peroxydisulfate and hydrochloric acid. (J. Huang, R. B. Kaner, "Nanofiber Formation In The Chemical Polymerization Of Aniline: A Mechanistic Study", *Angew. Chem., Int. Ed,* 43, 5817 (2004)) When as prepared nanofibers are washed with water and separated by centrifugation to remove excess acid and other by-products, the supernatant becomes more intensely green and the nanofibers become purer with an increasing number of washings. Referring to FIG. 2*a-d*, after three cycles of washing-centrifugation, (FIG. 2*c*) the supernatant remains dark green even with centrifugation at 3 000 rpm for 0.5 h or longer. (FIG. 2*d* shows 1 cc of the solution of FIG. 2C diluted 4 to 1 with 0.005M HCl). These results show that a stable polyaniline colloid has been created by extensive washing.

Figure 3:
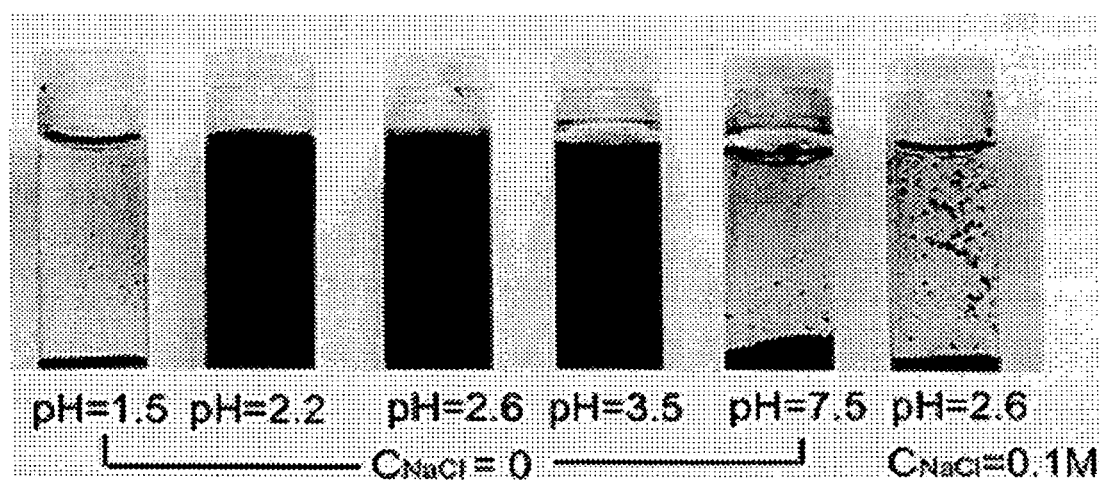
FIG. 3 shows a colloid of 1 mg/ml of polyaniline nanofibers at different pH's (1.5, 2.2, 2.6, 3.5, and 7.5) and after the addition of 0.1M NaCl to a 2.6 pH solution, in each instance after standing at room temperature for 12 hours.

Different doping acids such as hydrochloric, sulfuric and camphorsulfonic can also be used to stabilize the colloids. As shown in FIG. 3, two key parameters affecting the stability of the colloids are the pH and the concentration of electrolytes. Doped polyaniline colloids are reasonably stable (a stability suitable for most applications) at a pH of 1.5-4.0, with the colloidal suspension being stable for several hours, at least a week or even to two or more months, depending on the pH. The optimal pH for a stable colloid (stable for two or more months) is 2.6±0.5. When the pH is close to 4, the colloid turns blue and then changes to blue/violet as the pH increases to 7, indicating that dedoping occurs. Dedoping causes a loss of charge on the polymer chains, leading to flocculation of the colloid of about a pH of 10. However, relatively stable colloids of dedoped material can be formed at a pH of 4.0-10.0. This result indicates that it is preferred to keep the polymer chains positively charged to stabilize the colloids. Adding an electrolyte such as a higher concentration of acid or a salt (e.g. NaCl) also results in the precipitation of the colloid. All these behaviors are characteristic of a lyophobic colloid stabilized through electrostatic repulsion and can be explained using the classical Derjaguinn-Landau-Verwey-Overbeek (DLVO) theory. (R. J. Hunter, *Foundations of Colloid Science*, Oxford University Press, New York, 1 (1987)) Like other lyophobic colloids, the stability of the polyaniline colloid is also dependent on its concentration. A colloid of 10 mg ml$^{-1}$ is generally stable for 1 day, while a colloid of 0.5 mg appears to be stable for at least two months at the optimal pH of 2.6. Although concentrated dispersions do not exhibit long term stability, precipitated polyaniline nanofibers are still redispersable, with little effect on their processability.

Figure 4:
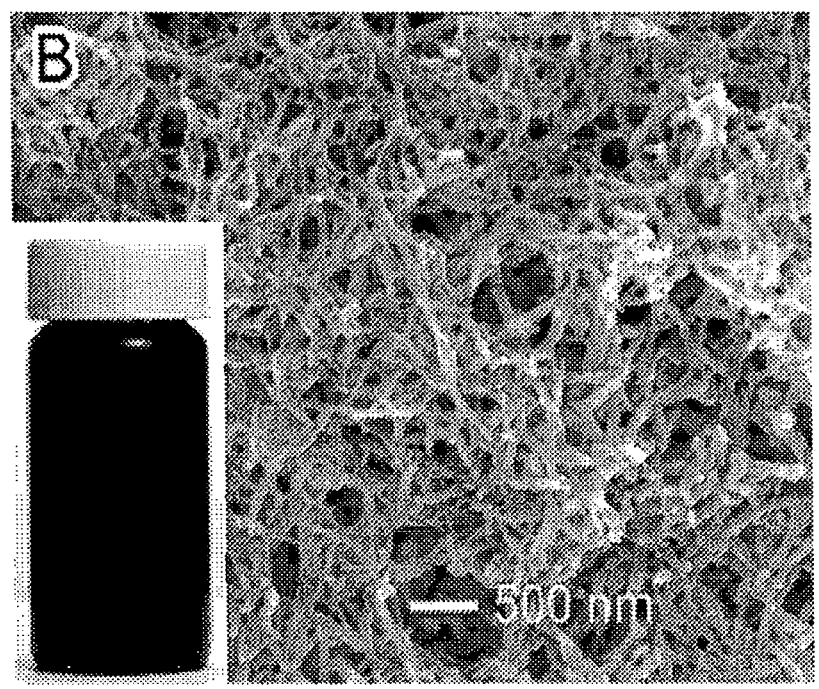
FIG. 4 is an SEM of a film formed from polyaniline with slow addition of the reactants and no stirring; the inset shows the materials formed dispersed in water.
Figure 5:
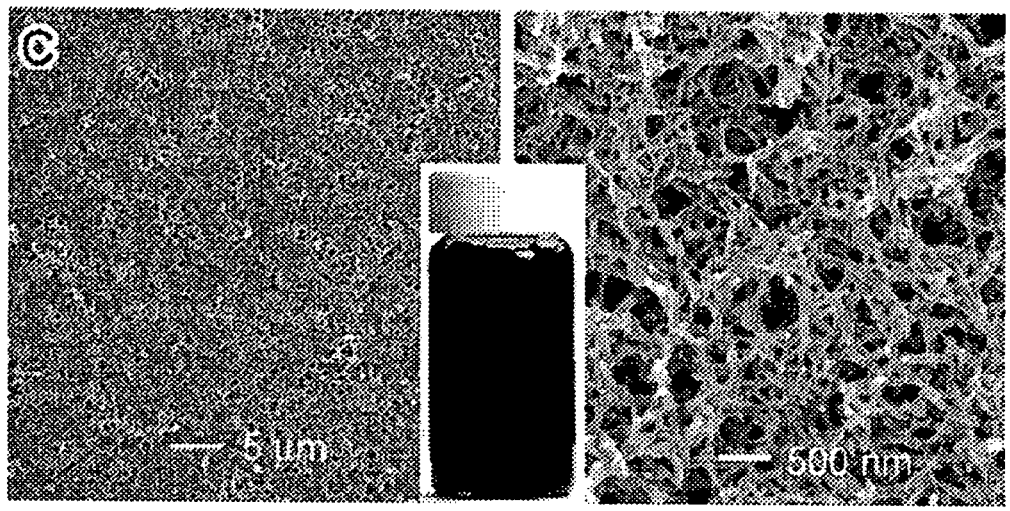
FIG. 5 is an SEM of a polyaniline film formed from nanofibers formed with vigorous shaking for 30 seconds in initial reaction stages but with stirring terminated prior to induction of polymerization.
Figure 6:
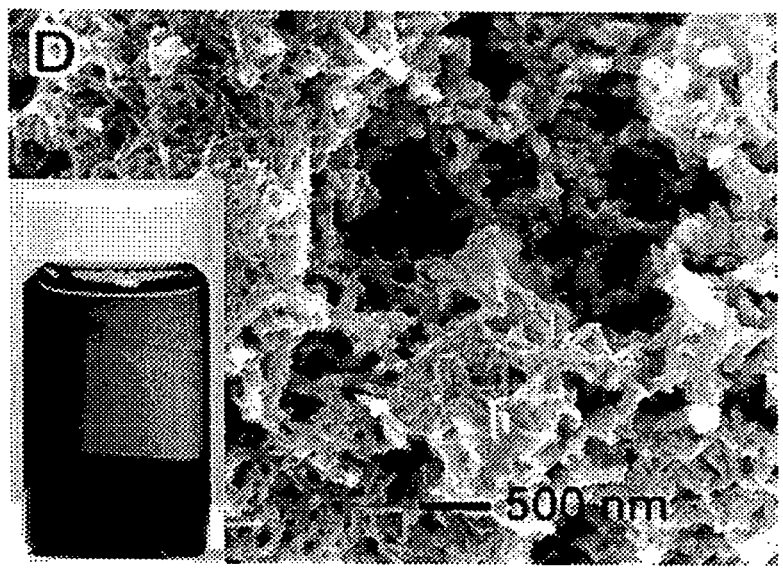
FIG. 6 is an SEM of a film formed from polyaniline nanofibers produced with vigorous stirring throughout the entire polymerization process. The inset shows that the polymer does not stay dispersed in solution.

In addition, as shown in FIG. 4, when no stirring is applied to the slow-addition polymerization process, the resulting product is composed mainly of smooth nanofibers. The nanofibers are comparable in size and shape to those produced from reactions in which the reactants are rapidly mixed with vigorous stirring, but where the stirring is stopped before the induction period of the polymerization ends (FIG. 5). In the rapidly-mixed reactions, if intense stirring is kept up during the entire polymerization process, the nanofibers obtained are highly aggregated and the number of granular nanoparticulates increases as a function of the stirring speed (FIG. 6). It was also observed that significant morphological changes and aggregation of the product occurs if the interfacial polymerization is stirred or shaken vigorously. It has been concluded that the essential reason that high-quality polyaniline nanofibers form in the interfacial polymerization process is because the reaction is not stirred.

It has now also been determined that irreversible aggregation of polyaniline nanoparticles that often occurs during the course of synthesis does not result directly from mutual attraction of particles as traditional aggregation theory suggests. Instead, the behavior of nucleation of nanoparticles plays a crucial role in the aggregation of the resulting particulates. Mechanical agitation, which is a common method for disrupting aggregates, instead affects the nucleation process and dramatically triggers aggregation. Accordingly, the shape of polyaniline nanoparticles has been found to be related to the mode of nucleation. By examining the shape evolution of polyaniline nanoparticles during synthesis, the aggregation mechanism for particles during formation and the synthetic processes for producing these materials, it has been demonstrated that the shape and aggregation of polyaniline nanoparticles prepared by the chemical oxidative polymerization of aniline is related to the mode of nucleation. Homogeneous nucleation results in nanofibers, while heterogeneous nucleation leads to granular particulates. Based on this unique phenomenon, which is an unusual effect of mechanical agitation on the nucleation and aggregation of nanoparticles, a mechanism is set forth below for aggregation triggered by heterogeneous nucleation. The results are of considerable value in reproducibly synthesizing nanoparticles with well-controlled sizes and shapes and in effectively preventing aggregation in chemical, pharmaceutical and materials production processes.

For the comparisons discussed below, multiple samples of polyaniline were prepared using the following procedure. A first vial of 0.3 ml of aniline monomer and a second vial of 0.18 g of ammonium peroxydisulfate were each dissolved in 10 ml of 1.0 M HCl, respectively. All chemicals were of analytical grade and used as received. The contents of the two vials were then poured rapidly into a 30 ml clean glass container and shaken vigorously for ~30 sec. One mixture was left unstirred while the others were stirred with an ordinary magnetic stirrer (Corning Inc.) at different speeds for 2 h. Stirrer bars (9.5 mm diameter×25 mm long) were used for all reactions. The resultant mixture was thoroughly purified by dialysis against 5.0 mM HCl. To deposit polyaniline films on glass slides via in-situ polymerization, 3.5×2.5 cm glass slides were treated by Piranha solution ($H_2SO_4/H_2O_2$) for 2 h, rinsed with deionized water and then put into the newly mixed reaction solution for 2 h. The films which formed on the glass slides were thoroughly rinsed with flowing water to remove loosely attached particles and then immersed in 0.5 M HCl for 0.5 h and dried in air. UV-Vis spectra were then recorded on an HP 8453 spectrometer.

SEM images were taken with a JEOL JSM-6700F Field Emission SEM microscope. A small drop of the resulting dispersion (~2 g/l) was cast on a silicon wafer and dried in air for SEM imaging. No gold was coated prior to SEM imaging. The particle size distribution was measured with a Beckman Coulter LS 13320 Laser Diffraction Particle Size Analyzer using 5 mM HCl as the working fluid. The multi-wavelength analyzer is capable of simultaneously measuring particle sizes ranging from 40 nm to 2 mm. Before each measurement the dispersion was diluted 10 fold with 5 mM HCl and vigorously shaken for ~30 s. An aqueous solution of pH ~2.5 was used as the working fluid in order to achieve repeatable measurements. If pure water is used, polyaniline particles become dedoped and will aggregate, resulting in incorrect results. The particle size measurement was based on the assumption that the particles are spherical. Although polyaniline particles are not spherical, the results are quite reliable for comparative analysis.

Silica nanoparticles were prepared using the classical Stober method. Ethanol (46 ml), tetraethylorthosilicate (2.6 ml), water (9.3 ml), and ammonia hydroxide (2.0 ml of 29%) were mixed in a 100 ml bottle and shaken vigorously for ~1 min and then the mixture was split into three equal portions and poured into three 30 ml bottles. These solutions were then stirred with a magnetic stirrer bar at different speeds for 4 h. For the low temperature reactions, the reactants and bottles were pre-cooled to 0° C. in an ice-water bath prior to mixing and the reaction mixtures were kept in an ice-water bath overnight. The particle size distributions were measured with the same particle analyzer but deionized water was used as the working fluid.

Figure 1:
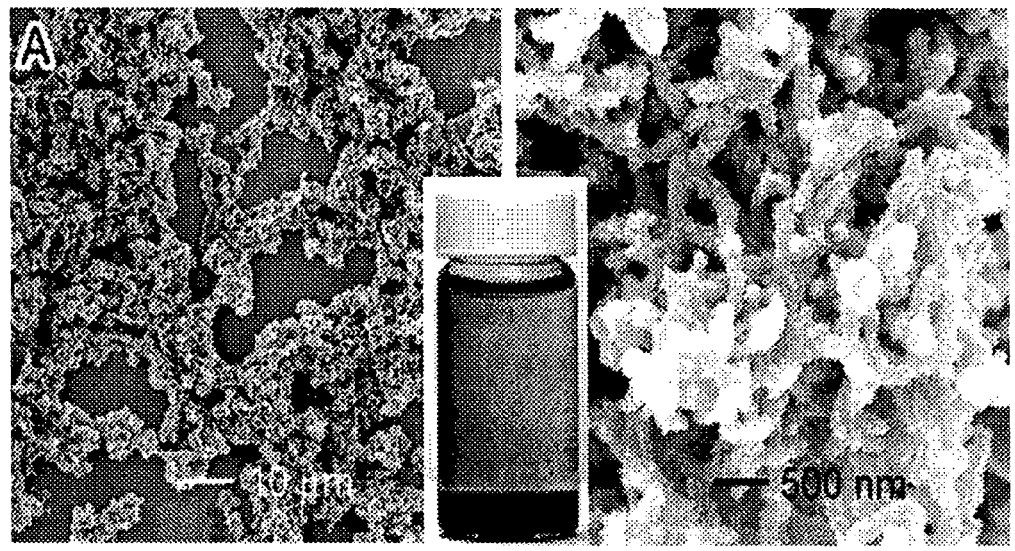
FIG. 1 is a SEM images at two different magnifications of a film formed from polyaniline using conventional reaction and processing techniques. The inset shows that the polymer does not stay dispersed in solution.

FIGS. 1 and 4-6 are SEM images of polyaniline synthesized by reacting 0.3 ml of aniline in 10 ml of 1.0 M HCl with 0.18 g of ammonium peroxydisulfate in 10 ml of 1.0 M HCl at 25° C. FIG. 1 shows the result of adding the ammonium peroxydisulfate solution dropwise into the aniline solution at ~5 ml/h while stirring at 1100 RPM. To produce the nanofibers shown in FIG. 4 the ammonium peroxydisulfate solution was added dropwise into the aniline solution without stirring. To produce the nanofibers shown in FIG. 5 the two reactant solutions were mixed rapidly with vigorous shaking for ~30 sec and then left standing for 2 hours. The two reactant solutions were mixed rapidly and stirred at 1100 RPM for 2 h to produce the nanofibers of FIG. 6. The vials shown in the insets of FIGS. 1, 4, 5 and 6 contain the resultant products after standing undisturbed for 36 hours. The low-magnification SEM images on the left side of FIGS. 1 and 5 are presented to compare the quality of films cast from the dispersions of polyaniline particles prepared with different mixing conditions. One can see the effect of stirring on aggregation by observing the settling speed of polyaniline precipitates and the volume of the resulting sediments shown in the insets in FIGS. 1, 4, 5 and 6. In the absence of stirring, polyaniline nanofibers prepared under the conditions presented in FIGS. 4 and 5 remain suspended in the reaction solution without any noticeable sedimentation for months. However, if the reaction is stirred during the polymerization such as the nanofiber dispersions shown in FIGS. 1 and 6, the sedimentation is immediately observable when the stirring is stopped. The higher the stirring speed, the faster the polyaniline particles settle out. Shaking the reaction solution gives a similar result. This phenomenon is also observed at different reaction temperatures and when different acids, e.g. sulfuric, perchloric, or camphorsulfonic, are added into the reaction media. This effect of mechanical agitation is contrary to everyday experience in which stirring or shaking helps disrupt aggregation.

The stirring-induced aggregation can be quantitatively characterized by particle size analysis. Also, the post-synthetic aggregation of polyaniline particles in an aqueous dispersion can be prevented via electrostatic repulsions if the pH is set properly.

Figure 7:
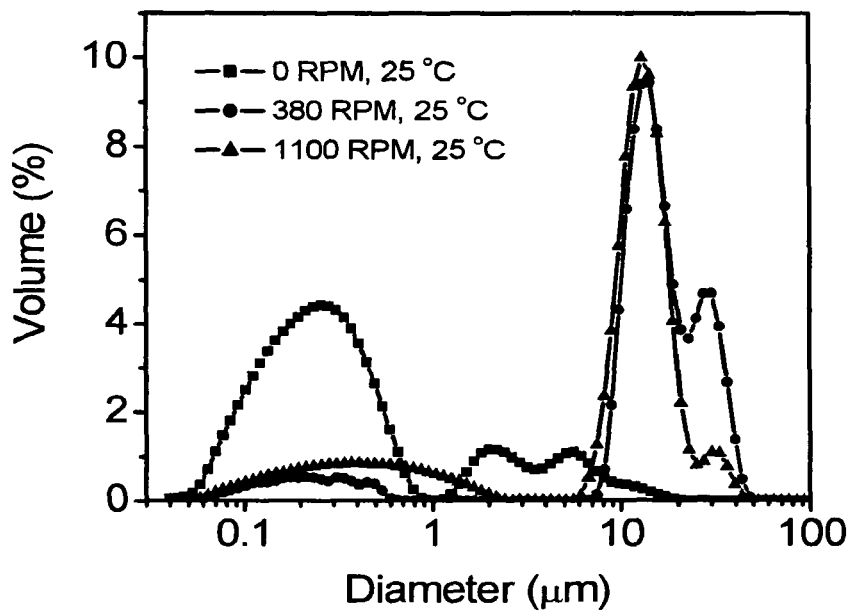
FIG. 7 is a graph showing the effect on particle diameters of different stirring speeds during polymerization at 25° C.
Figure 8:
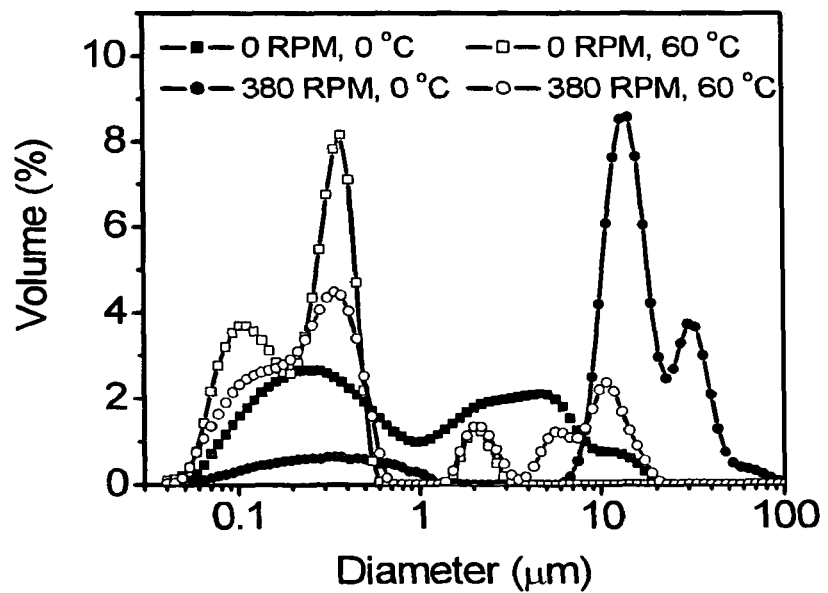
FIG. 8 is a graph showing the effect on particle size of temperature (0° C. and 60° C.) with mixing at 380 RPM or unstirred.

With the interference due to post-synthetic aggregation minimized by adjusting the pH to an optimal window, the original particle sizes of the polyaniline products can be reliably measured with a light scattering-based particle size analyzer. FIGS. 7 and 8 are graphs that show the particle size distributions of the purified products prepared at different temperatures (0°, 25° and 60° C.) and stirring speeds (0, 380 and 1100 RPM). In the variations tested, a stirred reaction results in a higher percentage of large particle sizes than a non-stirred reaction. For example, 80% of the polyaniline particles prepared without stirring at room temperature are less than 1 μm, while nanofibers prepared using a stirring speed of 380 RPM contain only 9% with diameters less than 1 μm and over 88% greater than 10 μm. These results, together with the SEM observations, indicate that the big particles >1 μm are actually irreversible agglomerates of nanofibers and granular nanoparticulates. These graphs show that no stirring and moderate temperatures are preferred for nanofiber formation with minimized aggregation or agglomeration.

An attempt was made to interpret this stirring-induced, aggregation phenomenon using the conventional coagulation theory of colloids. It is known in colloidal science that mechanical agitation can perform two opposite roles in the flocculation of colloidal particles (Oles, V. "Shear-Induced Aggregation And Breakup Of Polystyrene Latex-Particles", *J. Colloid Interface Sci* 154, 351 (1992). Mechanical shear, which is widely used, can break up aggregate particulates and keep particles well dispersed in liquids. This effect may account for the observation that the particles synthesized at 1100 RPM are sometimes slightly smaller than those obtained at 380 RPM (FIG. 7). On the other hand, stirring could induce colloidal coagulation because stirring-induced shear can enhance the mutual collisions of particles in both intensity and probability. This latter phenomenon was found to occur in the preparation of polyaniline nanofibers. This is supported by the discovery that sedimentation is observed if stable polyaniline suspensions prepared in the absence of mechanical disturbances are stirred after the polymerization is complete. However, compared to the case of stirring applied during polymerization, the sedimentation induced by post-synthetic stirring is much less remarkable. Moreover, we find that once the sediments are purified and diluted, their particle size distributions are almost identical to the case without post-synthetic stirring, indicating that the aggregation induced by post-synthetic stirring is reversible and that shear-induced coagulation is not the key reason for the stirring-induced aggregation of polyaniline.

Figure 9:
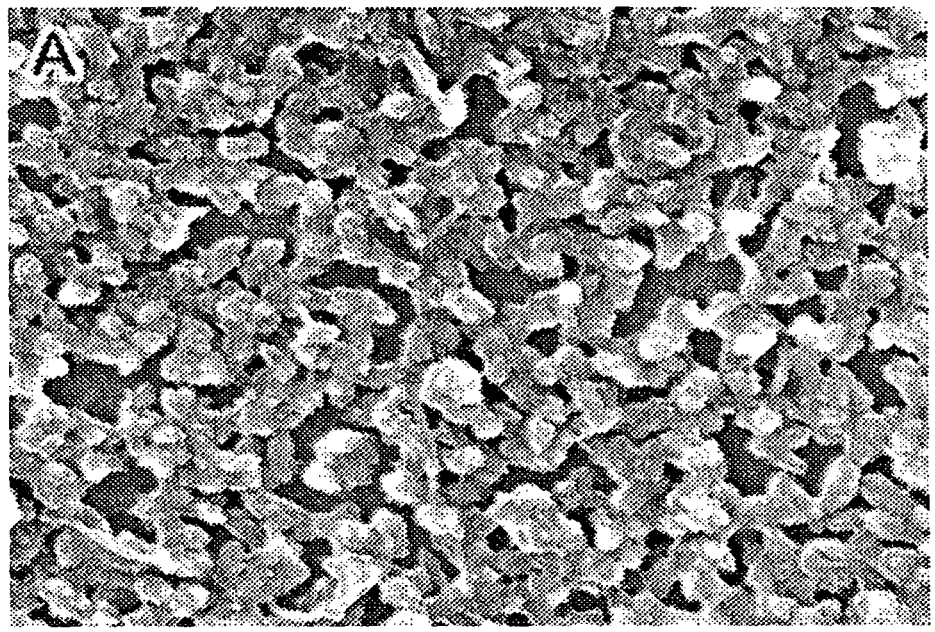
FIG. 9 is an SEM photograph of a film of polyaniline nanofibers formed using a bulk polymerization process at 25° C. with stirring prior to initiation (same conditions as in FIG. 5).
Figure 10:
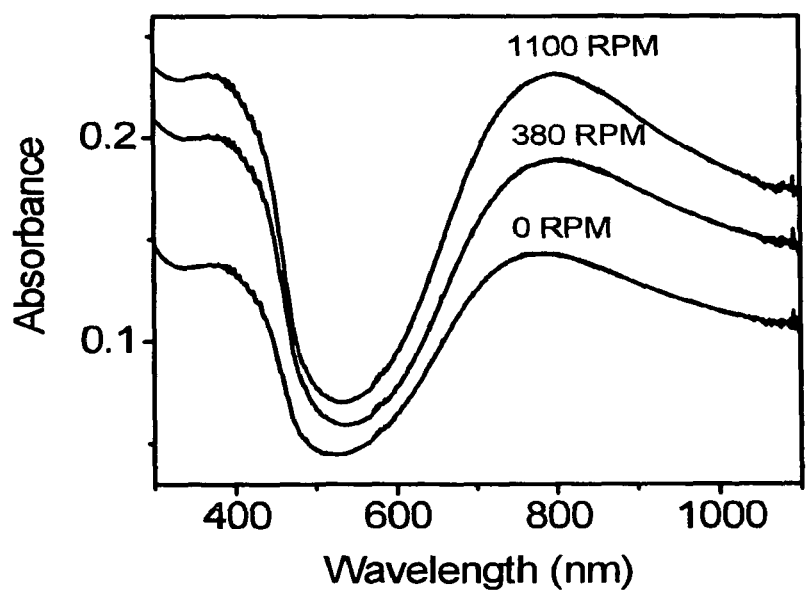
FIG. 10 is a UV-Vis spectra of films formed via in-situ deposition with stirring at 380 RPM, 1100 RPM or without stirring.

Polyaniline is insoluble in water. The formation of polyaniline chains is always followed by a rapid precipitation of the polymer. In terms of classical nucleation or precipitation theory (Zettlemoyer, A. C., *Nucleation* Marcel Dekker, New York (1969)), the molecules need to accumulate to a specific super-saturation level first and then experience nucleation and growth. The nuclei can be formed spontaneously and homogenously in the parent phase or they can be heterogeneously grown on other species such as reactor surfaces or other particles in solution. It was determined that both modes of nucleation occur with polyaniline and the mode that predominates is dependent on the experimental conditions. In particular, the shape of the polyaniline particles was found to be related to the mode of nucleation. Consistent with our previous observations (Huang et al.; ibid (2004)), at the initial stage of polymerization, as-formed particles are exclusively nanofibers, characterized by smooth surfaces and fairly uniform sizes. Since there are no heteronuclei available in the bulk solution at this stage, this fibrillar shape can be attributed to the result of homogenous nucleation. As the polymerization proceeds under shear, granular nanoparticulates gradually grow on the prior formed nanofibers, leading to the formation of coral-like aggregates. It should be noted that as bulk polymerization proceeds, a polyaniline film will be deposited on the reactor surface or other substrates in contact with the reaction solution. This film, shown in FIG. 9, consists of granular nanoparticulates regardless of whether or not the reaction solution is stirred, again consistent with prior observations (Avlyanov, J. K., Josefowicz, J. Y., MacDiamid, A. G, "Atomic-Force Microscopy Surface Morphology Studies Of In-Situ Deposited Polyaniline Thin Films", *Synth, Met.,* 73, 205 (1995); Stejskal, J., Sapurina, I., Prokes, J. Zemek, "In-Situ Polymerized Polyaniline Films", *Synth. Met.* 105, 195 (1999)). These results clearly indicate that the granular shape is related to the heterogeneous nucleation of polyaniline. The observation that a considerable amount of granular nanoparticulates appear in the product prepared with stirring suggests that stirring favors heterogeneous nucleation. This is also confirmed by the observation that the thickness (which is proportional to the absorbance) of in-situ deposited films on substrates increases with stirring speed (FIG. 10).

Figure 12:
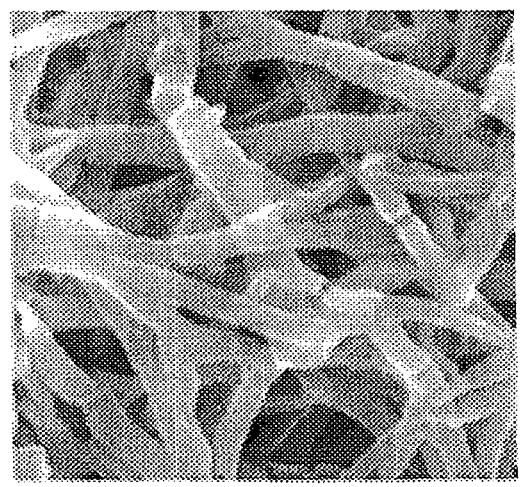
FIG. 12 is an SEM photo showing 120 nm diameter polyaniline nanofibers used for seeding experiments.
Figure 13:
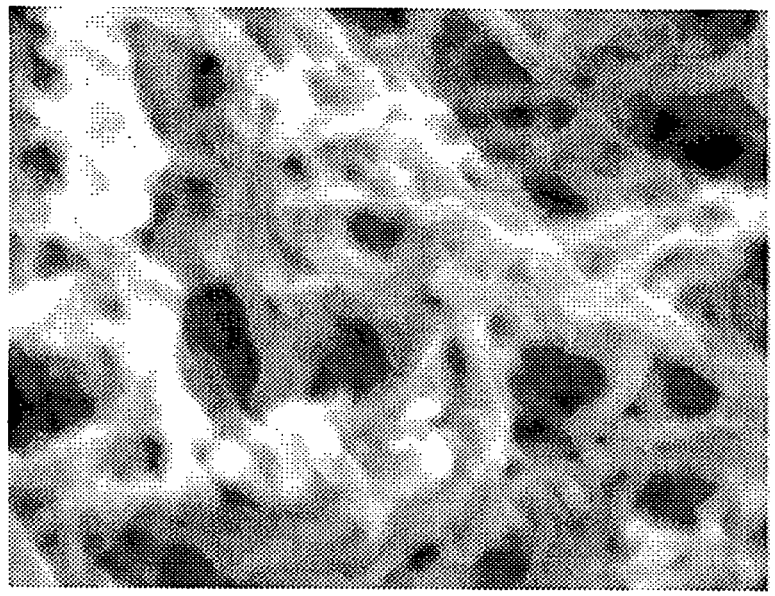
FIG. 13 is an SEM photo showing nanofibers formed using the seed fibers of FIG. 12 without stirring.
Figure 14:
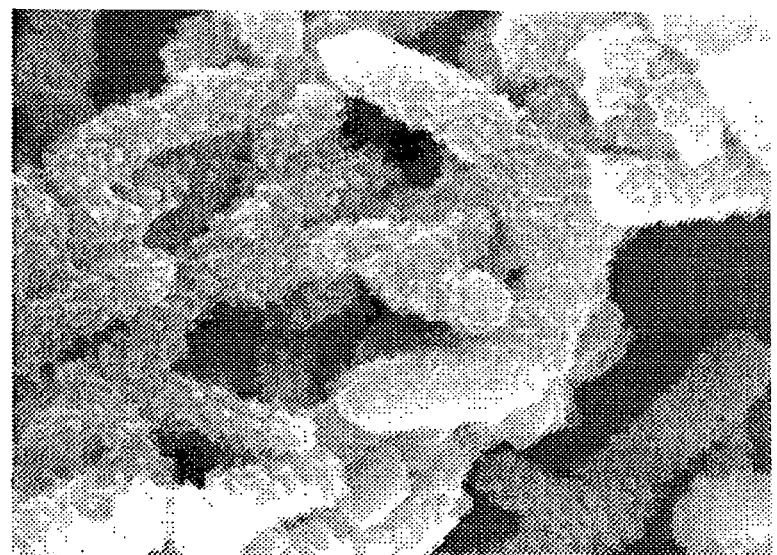
FIG. 14 is an SEM photo showing nanofibers formed using the seed fibers of FIG. 12 with stirring at 1100 rpm.
Figure 15:
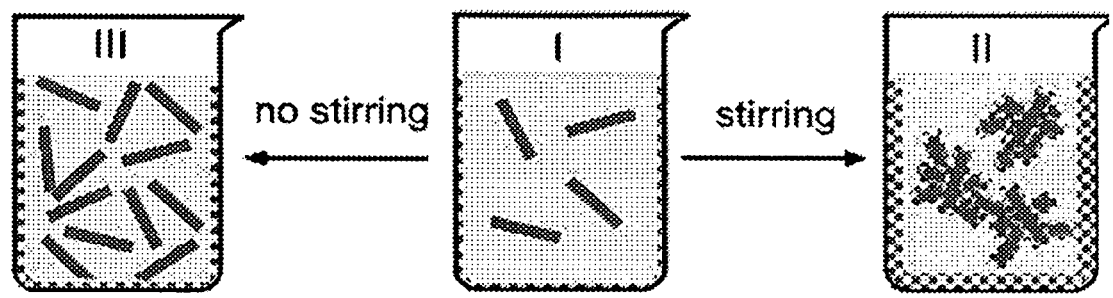
FIG. 15 is a schematic representation of the process of nanofiber growth with and without stirring.

To further examine the correlation between shape and nucleation mode of polyaniline, seeded-growth experiments were conducted in which pre-prepared ~120 nm diameter nanofibers, shown in FIG. 12, were added into an aniline solution in hydrochloric acid followed by the dropwise addition of a solution of ammonium peroxydisulfate. FIGS. 13-14 are SEM images of polyaniline samples taken from seeded-growth experiments. FIG. 13 shows the result of performing the reaction without stirring. FIG. 14 shows the results of stirring at 1100 RPM. FIG. 15 is a schematic representation of the two different procedures showing the formation and aggregation of polyaniline particles. The rods represent nanofibers and the dots represent polyaniline particles that result from homogeneous and heterogeneous nucleation, respectively. It was found that if no stirring is used, a large amount of new nanofibers of ~30 nm, characteristic of the nanofibers prepared in hydrochloric acid, appear in the product (FIG. 13) while the morphological change to the pre-added fibers is unremarkable. In contrast, if the reaction is stirred at 1100 RPM, granular nanoparticles will gradually grow on the pre-added fibers and the surface roughness and thickness of the pre-added fibers increase with the addition of the oxidant, leading to the formation of coral-like fibers as shown in FIG. 14.

Figure 11:
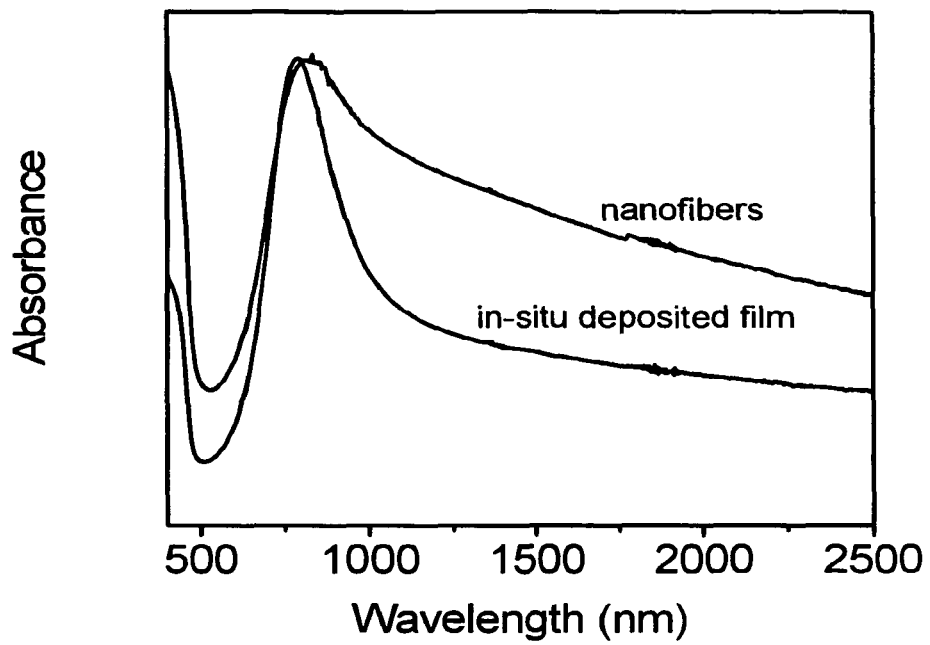
FIG. 11 is an NIR spectra of polyaniline films cast from a nanofiber dispersion or formed by in-situ deposition from the same reaction mixture.

Mechanical agitation is known to affect the nucleation rate of some materials (Zettlemoyer, ibid). However, the mechanism of nucleation under unsteady conditions is not well understood. Nonetheless, recent theoretical simulations of nucleation behavior under shear using the crystallization of colloidal hard-spheres as a simplified model suggest that shear can cause a significant suppression of the homogeneous nucleation rate (Blaak, R., Auer, S., Frenkel, D, Lowen, H. "Crystal Nucleation Of Colloidal Suspensions Under Shear", *Phys. Rev. Lett.,* 93, 068303-1 (2004)). Nucleation is always connected with local changes in concentration and structure. It has been suggested that the molecules to be nucleated will form transient nanoscale ordered regions or embryos prior to nucleation (Zettlemoyer, ibid). However, in the formation of polyaniline nanofibers, it has now been discovered that stirring can destroy these transient ordered regions or dilute local concentrations of polyaniline molecules, thereby decreasing the probability of homogenous nucleation. We have found that the conformation of polymer chains in polymer nanofibers is different from that of granular particles. As shown in FIG. 11, a film which we cast from a nanofiber dispersion exhibits higher absorbance in the near infrared region (NIR) (700-2500 nm) than a film prepared on a glass slide via in-situ deposition from the same reaction solution using prior techniques (Xia, Y., Wiesinger, J. M., MacDiamid, A. G, Epstein, A. J., "Camphor-Sulfonic Acid Fully Doped Polyaniline Emeraldine Salt-Conformations In Different Solvents Studied By An Ultraviolet-Visible Near-Infrared Spectroscopic Method", *Chem. Mater,* 7, 443 (1995)), indicative of a more extended conformation of the polymer chains in the nanofibers. Mechanical shear is able to make the polymer chains in the solution more coiled, hindering homogenous nucleation. On the other hand, mechanical shear can enhance collisions between embryonic nuclei and the pre-formed particles or the reactor surfaces, which may decrease the activation energy of heterogeneous nucleation and thereby facilitate this mode of nucleation.

Based on the observations made regarding the nucleation behavior of polyaniline under shear, a new aggregation mechanism for polyaniline particles is shown in FIG. 15. In the initial stage (I), as polyaniline nanofibers form in solution via homogeneous nucleation, they are forced to collide into each other due to mechanical shear and Brownian motion. Under shear, heterogeneous nucleation occurs on the surfaces of these particles including the contact points of the pre-formed particles. The nuclei at the collision points function like nanoscale glue to link the particles together, causing aggregation of the pre-formed particles (II). Subsequent growth of the nuclei and the formation of new heteronuclei on their surfaces further solidifies the aggregation. In contrast, in the absence of stirring, heterogeneous nucleation is suppressed and the nanofibers are produced continuously and are therefore well dispersed (III).

Figure 16:
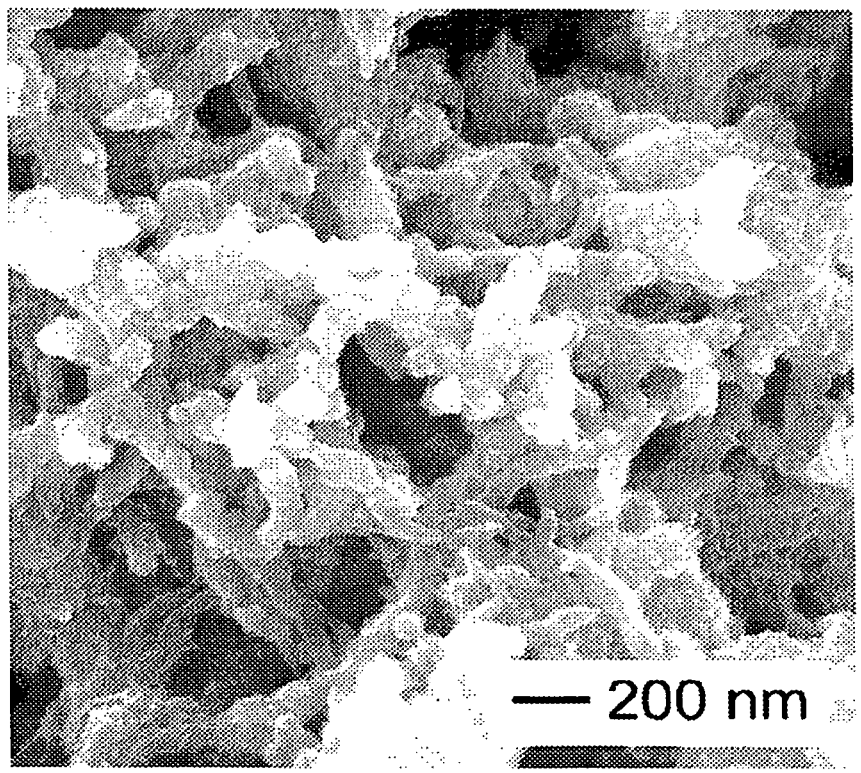
FIG. 16 is an SEM photo of a polyaniline film formed from nanofibers prepared at 0° C.
Figure 17:
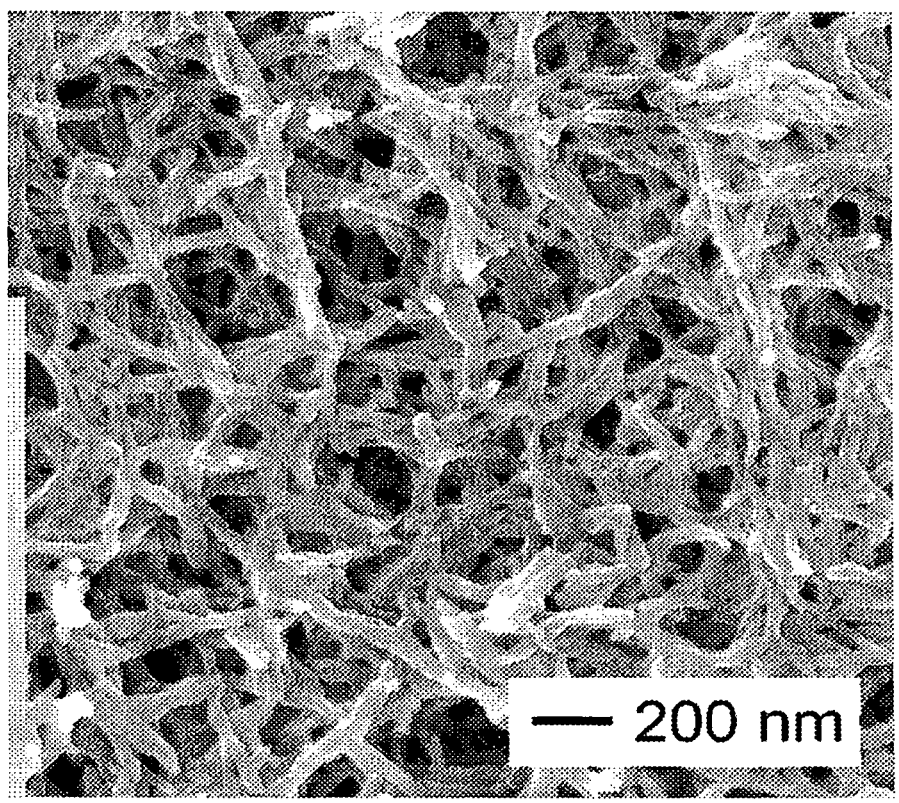
FIG. 17 is an SEM photo of a polyaniline film formed from nanofibers prepared at 60° C.
Figure 18:
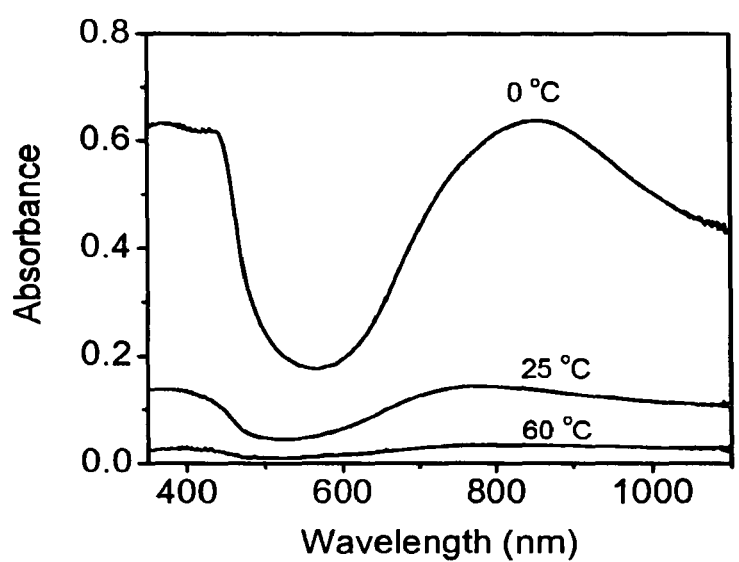
FIG. 18 is a UV-Vis spectra of films fabricated via in-situ deposition of nanofibers formed at 0°, 25°, or 60° C.

As discussed above, the effect of the reaction temperature on the size of the resulting polyaniline particles further supports the concept that heterogeneous nucleation can induce aggregation. The nucleation behavior of polyaniline is highly dependent on the reaction temperature. The influence of reaction temperature on the shape of polyaniline particles and the thickness of in-situ deposited films is shown in FIGS. 16-18. FIGS. 16 and 17 are SEM images of polyaniline films formed of polymer synthesized from the same reaction except that the film shown in FIG. 16 is formed from polyaniline prepared at 0° C. and the film of FIG. 17 was prepared from polyaniline nanofibers formed at 60° C. FIG. 18 is a UV-Vis spectra of films fabricated via in-situ deposition from the reaction using vigorous mixing initially but with the reactions carried out at different temperatures (0°, 25°, 60° C.). As shown in FIG. 16, polyaniline fibers obtained in the absence of stirring at 0° C. have rough surfaces and are more like the sample shown in FIG. 1. In contrast, there are almost no granular particulates in the product prepared at 60° C. (FIG. 17). The thickness of the in-situ deposited films is greatly increased with decreasing temperature (FIG. 18), as evidenced by the decrease in absorbance, which is consistent with a previous report of Stejskal (ibid). These results indicate that low reaction temperatures favor heterogeneous nucleation while higher reaction temperature favor homogeneous nucleation. As a result, the percentage of larger particles in the product prepared at low temperature is higher than that obtained at high temperature either with or without stirring (FIG. 8). Based on the reactions performed at 0°, 25°, and 60° C., the preferred temperature range is from about 10° C. to about 100° C., more preferably 60° C.±10° C. In the absence of mechanical stirring, the collisions of particles in the reaction solution can only be induced by Brownian motion. Consequently, the effect of temperature on the aggregation is not as great as the effect of stirring, as illustrated by FIG. 8.

Figure 19:
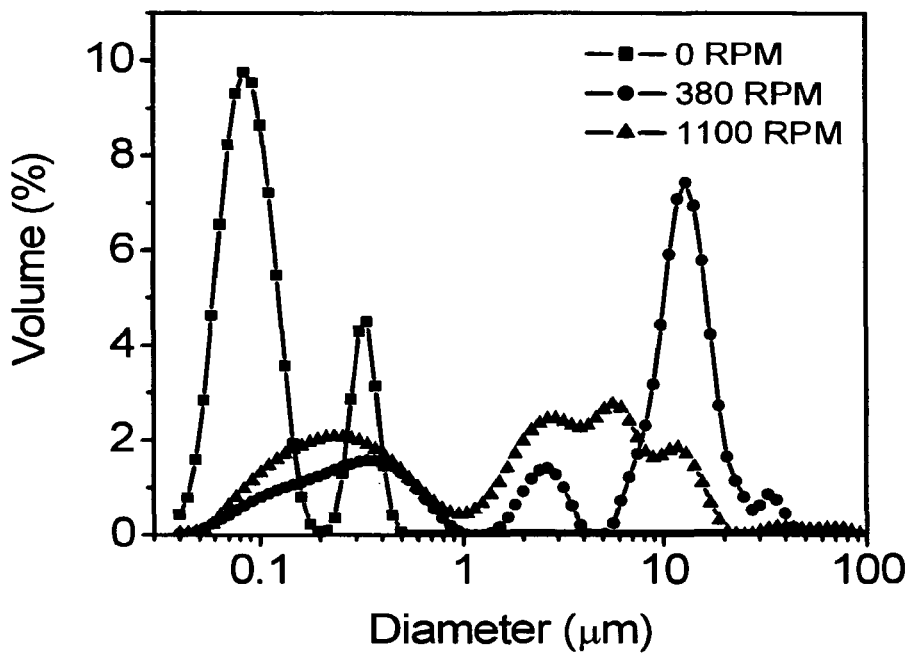
FIG. 19 is a graph showing the effect of stirring on particle size in the formation of poly (m-toluidine)
Figure 20:
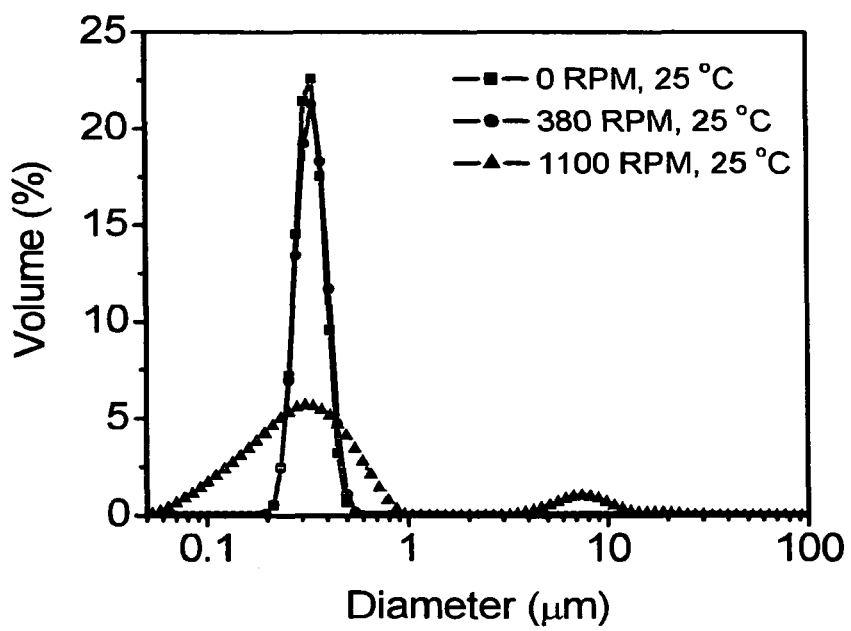
FIG. 20 is a graph showing the effect of stirring on silica particle formation at 25° C.
Figure 21:
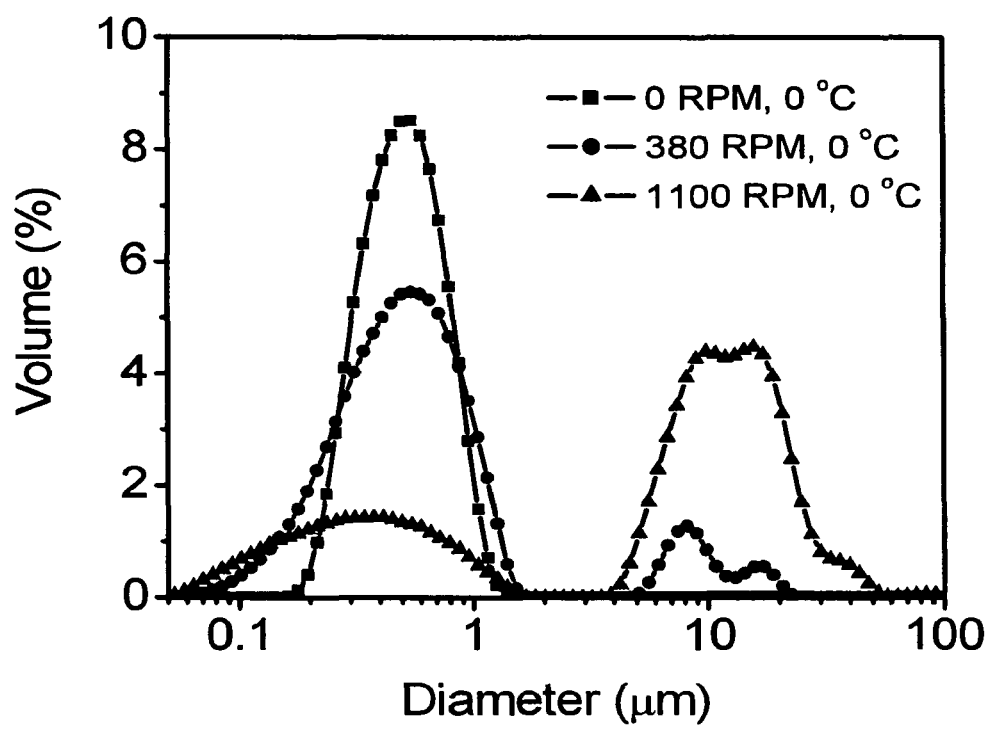
FIG. 21 is a graph showing the effect of stirring on silica particle size formation at 0° C.

The aggregation mechanism discovered for polyaniline appears to hold for other representative materials. FIGS. 19-21 demonstrate the effect of stirring on the particle size distributions of other particulate materials. For example, stirring has the same effect on poly(m-toluidine) (FIG. 19). This effect is also observed with inorganic nanoparticles such as silica colloids prepared using the classical Stober method (Stober, W., Fink, A. "Controlled Growth Of Monodisperse Silica Sphears In Micron Size Range, *J Colloid interface Sci.*, 26, 62 (1968) as shown in FIG. 20, the particle size distributions of silica are insensitive to mild stirring at room temperature (25° C.). However, the stirring-induced aggregation becomes noticeable once the stirring becomes intense (>380 RPM), and particularly when the reaction is carried out at a lower temperatures such as 0° C. (FIG. 21). The aggregation in these materials appears to involve the same mechanism as that in polyaniline. However, unlike polyaniline, these materials do not appear to have sharp differences in the shape of the particles that result from different modes of nucleation.

Unlike aggregation due to the direct attraction via van der Waals forces, surface nucleation-induced aggregation is irreversible. From a thermodynamic point of view, as heterogeneous nucleation and subsequent growth proceed, the molecules acquire a configuration that is favorable to minimizing the interfacial energy between the nucleus and its substrate. As a result, the particles, especially small particles that result from heterogeneous nucleation, will strongly bond to their substrates. The in-situ deposited films stick strongly to the substrates. In fact, spontaneous growth of films on a substrate from solution via heterogeneous nucleation has also been shown to be a simple route for fabricating robust ceramic films (Bunker, B. C. et al., "Ceramic Thin Film Formation On Functionalized Interfaces Through Biomimetic Processing", *Science*, 264, 48 (1994)).

Aggregation is very common in many synthetic processes. In conventional studies, this phenomenon has been simply ascribed to the direct mutual attraction between particles via van der Waals forces or chemical bonding. Because the shape of polyaniline nanoparticles is related to the mode of nucleation, a new mechanism for aggregation, and techniques to retard aggregation have been discovered. Since heterogeneous nucleation is generally much more widespread both in nature and technology than homogeneous nucleation (Kashchiev, D., "Nucleation: Basic Theory with Applications", *Butterworth-Heinemann*, Oxford, pp. 30 (2000)), the surface nucleation-induced aggregation can also exist in many other synthetic processes involving particles. Because this nucleation-controlled aggregation is mechanistically different from aggregation induced by direct attraction of particles, conventional methods for preventing aggregation, such as stirring, are not effective and have been found to result in an inverse effect such as stirring-induced aggregation.

In practice, if aggregation occurs in a reaction, one usually turns to the use of surfactants. For example, a German firm is providing polyaniline in a liquid carrier. However, to prevent the composition from agglomerating approximately 50% of the liquid composition is a surfactant. In contrast, we have found that it is unnecessary to use surfactants to prepare highly dispersible, stable polyaniline nanofibers.

Figure 22:
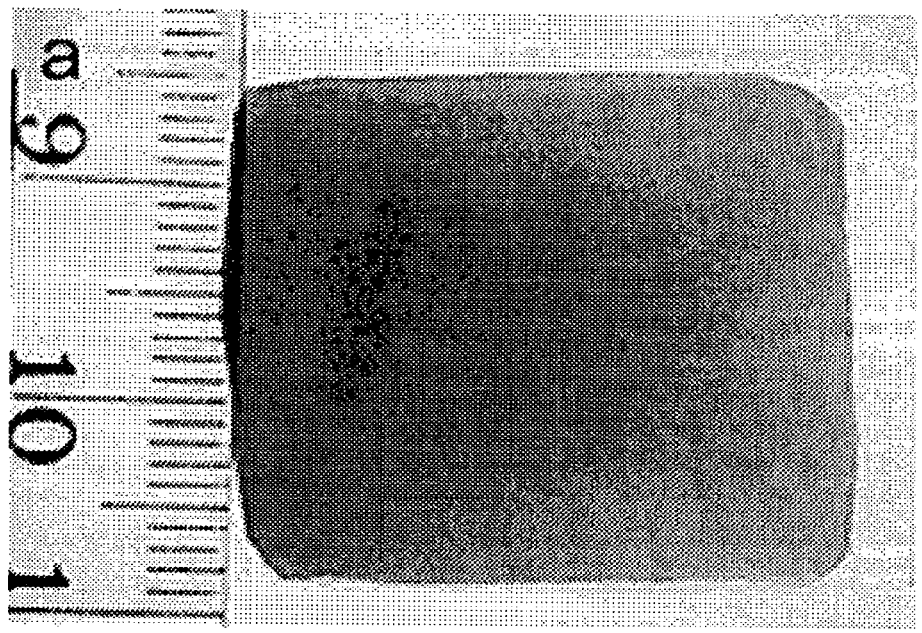
FIG. 22 is an optical image of a film cast on a glass slide from a stable polyaniline nanofiber colloid.
Figure 23:
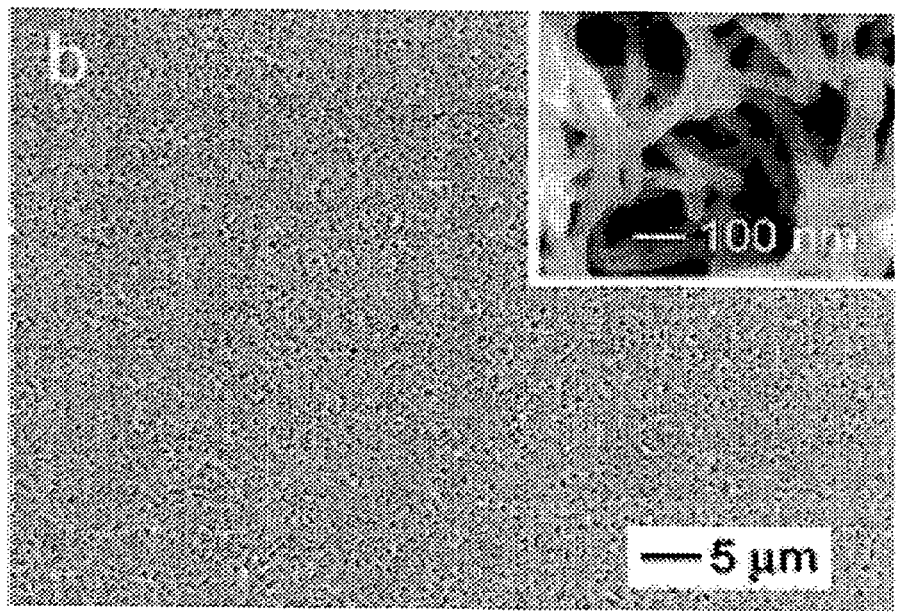
FIG. 23 is an SEM image at two different magnifications of a film cast on a silicon wafer from a stable polyaniline colloid.

The ability to form stable polyaniline colloids is necessary to process this conducting polymer for use in various applications. However, as a result of the techniques disclosed herein to produce stable colloids, polyaniline nanofibers can now be readily used in numerous previously unavailable applications such as stable conducting inks and paints, smart inks for electronic paper (e-paper), coatings for corrosion resistance, printable supercapacitors and batteries, nanoelectronics, flash welded circuits, etc. The stable polyaniline nanofiber colloids can now be delivered by standard printing or coating techniques. For example, the colloids can be applied to a substrate using an inkjet printer. Continuous films or coatings can be obtained simply through casting and evaporation, suggesting a simple and environmentally friendly method to process polyaniline for a variety of applications. Cast films exhibit a uniform green color and a relatively smooth surface as shown in FIGS. 22 and 23. The film is even smoother than films prepared from polymer-stabilized dispersions prepared by others (J. Stejskal, I. Sapurina, "On the Origin of Colloidal Particles in the Dispersion Polymerization of Aniline", *J. Colloid Interface Sci.*, 274, 489 (2004); P. R. Somani, "Synthesis and Characterization of Polyaniline Dispersions", *Mater. Chem. Phys.*, 77, 8.1 (2002)).

Figure 24:
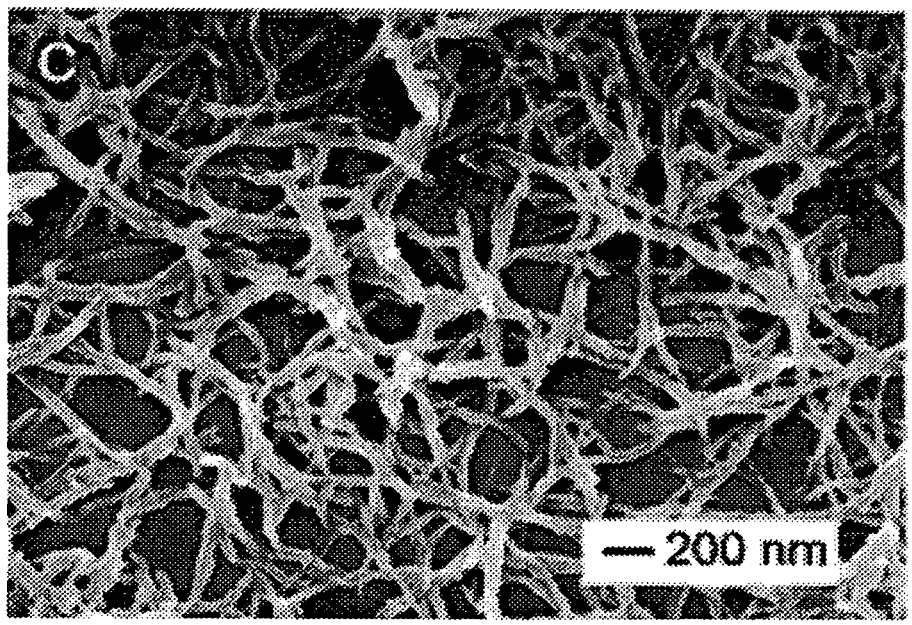
FIG. 24 is a SEM image of a monolayer of polyaniline nanofibers spontaneously absorbed on a silicon wafer.
Figure 25:
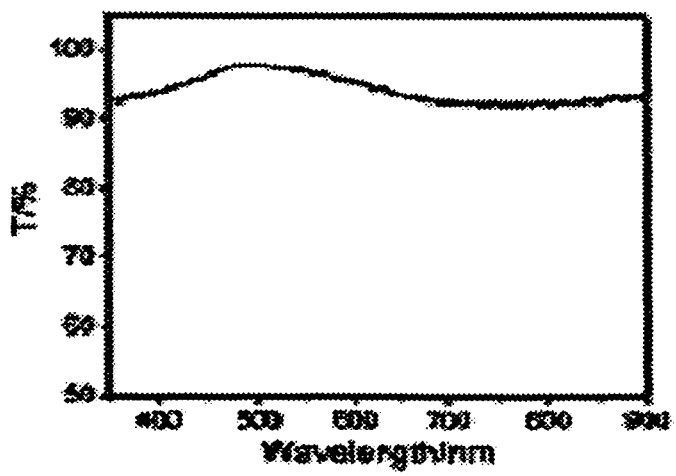
FIG. 25 is a graph of the transmission spectrum of the spontaneously formed monolayer shown in FIG. 24.

Once a stable colloid is formed, the adsorption behavior exhibited by these polyaniline colloids provides the ability to form thin films on surfaces placed in the colloidal suspension. When a glass slide or silicon wafer is immersed in a dilute stable colloid, an ultra-thin nanofiber layer is spontaneously adsorbed onto the substrate surface. The scanning electron microscopy (SEM) image shown in FIG. 24 demonstrates the ability to form a continuous nanofiber network by this technique. The formed films exhibit a slight green color and the transmittance in the visible region is higher than 90% (FIG.

25). Although the amount of the absorbed polyaniline is very small, a continuous conducting network of nanofibers is formed across the entire substrate as confirmed by conductivity measurements. This technique provides a simple way to integrate conductive polyaniline nanofibers into a device.

It is well known that silica and silicate glass surfaces immersed in water are negatively charged. When glass or silicon wafers are immersed in a cationic polyelectrolyte solution such as a colloidal suspension of positively-charged polyaniline nanofibers, a monolayer of this polyelectrolyte is deposited on these surfaces through electrostatic self-assembly. This also accounts for our observation that the amount of adsorbed nanofibers increases initially but then remains essentially constant. Thicker (or multilayered) films can be prepared by alternatively immersing films into the colloid and then into a polystyrene-sulfonic acid solution. These results suggest that the positively charged colloids are a good source for fabricating composite multilayered films consisting of polyaniline or other negatively charged materials using a layer-by-layer electrostatic self-assembly process. (J. H. Cheung, W. B. Stockton, M. F. Rubner, "Molecular-level processing of conjugated polymers 0.3. Layer-by-layer manipulation of polyaniline via electrostatic interactions", *Macromolecules,* 30, 2712 (1997)).

While silica or silica glass substrates are preferred other materials with a negative surface charge, or which can be provided with a negative surface charge, such as metals or plastics can also be used. The temperature of the colloidal suspension does not appear to be critical to formation of the film but a 25° C. to about 60° C. suspension is preferred.

Stable, pure aqueous polyaniline colloids can be readily prepared by purifying polyaniline nanofibers, controlling the pH and reaction temperature and proper use of stirring (or as required, elimination of stirring) without the need for any chemical modification or steric stabilizers. Electrostatic repulsive forces between nanofibers enable the long term stability of the colloids. Using the procedures set forth herein nanostructuring of conducting polymers can be accomplished. Also, based on the teachings herein, other conducting polymers such as polypyrrole and polythiophene can be made more processable through nanostructuring and tailoring of the charge on their polymer chains. In addition to enhancing the conventional applications of conducting polymers in chemical sensing, actuators, lightweight battery electrodes, light-emitting devices and anticorrosion coatings, the significantly improved processability as well as ease of synthesis of the conducting nanofibers make it possible to construct electroactive one-dimensional nanostructures which provide a new class of functional building blocks for fabricating nanoscale electronic devices together with carbon nanotubes and other metallic or inorganic nanowires. These well-dispersed nanofibers are also good sources or templates for fabricating other functional nanostructures and composites.

We claim:

1. A method of forming an image on a substrate comprising forming a stable aqueous colloidal suspension of the nanofibers, said stable suspension substantially free of a steric stabilizer, maintaining the stable colloidal suspension at a pH of 2.6±0.5 and applying the stable aqueous colloidal suspension of the nanofibers to the surface using standard printing techniques.

2. The method of claim 1 wherein the standard printing technique comprises using an ink jet printer.

3. A method of forming a stable, steric stabilizer-free aqueous colloidal suspension of polyaniline nanofibers comprising:
forming polyaniline in situ in an aqueous carrier, the aqueous colloidal suspension having a pH of 2.6±0.5 and is stable for at least about two months.

4. A method of forming a stable, steric stabilizer-free colloid of nanofibers consisting essentially of dedoped polyaniline formed in situ following formation of polyaniline in an aqueous carrier at a pH of from about 1.5 to about 4.0 by the step of adjusting the pH of the stable polyaniline colloid to from about 4.0 to about 10.0.

5. The method of claim 4 wherein the pH of the polyaniline colloid is adjusted to about 7.0.

6. A method of forming a stable, steric stabilizer-free aqueous colloidal suspension of polyaniline nanofibers comprising:
forming polyaniline in situ in an aqueous carrier,
wherein the in situ formed colloid of nanofiber polyaniline is prepared by
mixing the reactants, with any mixing or stirring terminated prior to initiation of polymerization, the pH of the polymerization composition being maintained at greater than about 1.5 but less than about 4.0 and the temperature being maintained at greater than about 10° C. but less than about 100° C. during polymerization to form the colloidal suspension of nanofibers wherein the colloidal suspension is purified by washing and centrifugation to remove excess acid and byproducts.

7. The method of claim 6 wherein the pH of the polymerization composition is maintained at between about 2.3 and about 3.5.

8. The method of claim 6 wherein the pH of the polymerization composition is maintained at about 2.6.

9. The method of claim 6 wherein the temperature of the reactants is maintained at from about 25° C. to about 60° C.

10. The method of claim 6 wherein the temperature of the reactants is maintained at 60° C.±10° C.

11. The method of claim 6 wherein aggregation of the polyaniline nanofiber is prevented or retarded during formation thereof by using no mechanical stirring or maintaining mechanical stirring to less than about 325 RPM.

12. The method of claim 11 wherein polymerization of the polyaniline is conducted without stirring.

* * * * *